United States Patent
Skärgård et al.

(10) Patent No.: US 11,460,654 B2
(45) Date of Patent: Oct. 4, 2022

(54) CABLE SHEATH MATERIAL

(71) Applicant: Hexatronic Cables & Interconnect Systems AB, Gothenburg (SE)

(72) Inventors: Fredrik Skärgård, Nasviken (SE); Jonas Ekstedt, Forsa (SE); Anders Lindroth, Hudiksvall (SE); Roger Färlin, Ljusdal (SE)

(73) Assignee: Hexatronic Cables & Interconnect Systems AB, Gothenburg (SE)

( * ) Notice: Subject to any disclaimer, the term of this patent is extended or adjusted under 35 U.S.C. 154(b) by 0 days.

(21) Appl. No.: 16/647,228

(22) PCT Filed: Sep. 13, 2018

(86) PCT No.: PCT/EP2018/074787
§ 371 (c)(1),
(2) Date: Mar. 13, 2020

(87) PCT Pub. No.: WO2019/053146
PCT Pub. Date: Mar. 21, 2019

(65) Prior Publication Data
US 2021/0033808 A1 Feb. 4, 2021

(30) Foreign Application Priority Data
Sep. 13, 2017 (EP) ..................... 17190947

(51) Int. Cl.
*G02B 6/44* (2006.01)
*C08L 23/06* (2006.01)
(Continued)

(52) U.S. Cl.
CPC .............. *G02B 6/443* (2013.01); *C08L 23/06* (2013.01); *C09D 123/06* (2013.01);
(Continued)

(58) Field of Classification Search
CPC ........ G02B 6/443; G02B 6/4486; G02B 6/50; G02B 6/52; G02B 6/54; C08L 23/06; C08L 2205/025; C09D 123/06
See application file for complete search history.

(56) References Cited

U.S. PATENT DOCUMENTS

| 2003/0035635 A1* | 2/2003 | Chastain | G02B 6/4459 |
| | | | 385/112 |
| 2004/0071416 A1* | 4/2004 | Militaru | G02B 6/4419 |
| | | | 385/113 |

(Continued)

FOREIGN PATENT DOCUMENTS

| EP | 0241330 A2 | 10/1987 |
| EP | 0858082 A1 | 8/1998 |

(Continued)

OTHER PUBLICATIONS

International Search Report for PCT Application No. PCT/EP2018/074787, dated Nov. 28, 2018, 4 pages.

*Primary Examiner* — Ellen E Kim
(74) *Attorney, Agent, or Firm* — Brake Hughes Bellermann LLP

(57) ABSTRACT

A cable assembly is provided, adapted to be installed into a duct by means of a combination of blowing and mechanical feeding. The cable assembly comprises: at least one flexible signal transmitting member for transmitting optical signals, a first layer surrounding said at least one signal transmitting member such that at least one signal transmitting member is in touching contact with said first layer, and a second layer arranged outwardly of said first layer, said second layer being a non-thermoplastic layer comprising a non-thermoplastic, crosslinked polyethylene material. A method of producing the cable assembly is also disclosed.

18 Claims, 7 Drawing Sheets

(51) Int. Cl.
  *C09D 123/06* (2006.01)
  *G02B 6/50* (2006.01)
(52) U.S. Cl.
  CPC ............ *G02B 6/4486* (2013.01); *G02B 6/50* (2013.01); *C08L 2205/025* (2013.01)

(56) References Cited

U.S. PATENT DOCUMENTS

| | | | | |
|---|---|---|---|---|
| 2007/0299043 | A1* | 12/2007 | Hunter | A61K 31/553 |
| | | | | 514/171 |
| 2010/0158457 | A1* | 6/2010 | Drozd | G02B 6/4432 |
| | | | | 385/113 |
| 2012/0178868 | A1* | 7/2012 | Esseghir | C08K 5/57 |
| | | | | 524/504 |
| 2014/0241679 | A1* | 8/2014 | Kachmar | G02B 6/4416 |
| | | | | 385/100 |
| 2014/0265322 | A1* | 9/2014 | Thompson | G02B 6/4459 |
| | | | | 285/345 |
| 2016/0133354 | A1* | 5/2016 | Cunningham | H01B 7/28 |
| | | | | 385/100 |
| 2016/0152807 | A1* | 6/2016 | Chaudhary | C08L 23/0815 |
| | | | | 428/375 |
| 2016/0340492 | A1* | 11/2016 | Sun | C08K 5/36 |
| 2017/0158847 | A1* | 6/2017 | Yu | C08L 23/16 |

FOREIGN PATENT DOCUMENTS

| | | |
|---|---|---|
| EP | 1821124 A1 | 8/2007 |
| WO | 9305424 A1 | 3/1993 |
| WO | 2014099360 A1 | 6/2014 |
| WO | 2015054893 A1 | 4/2015 |

\* cited by examiner

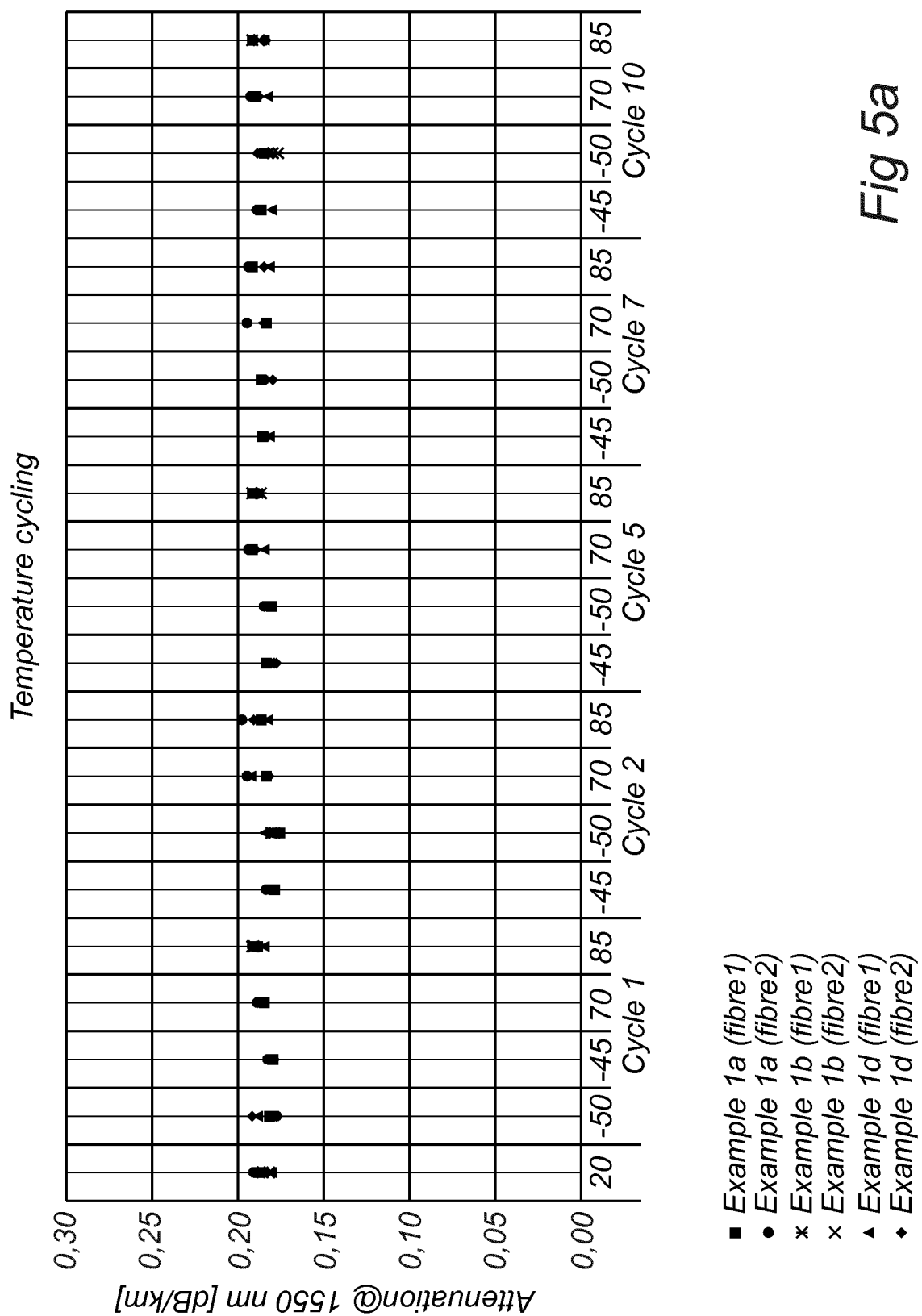

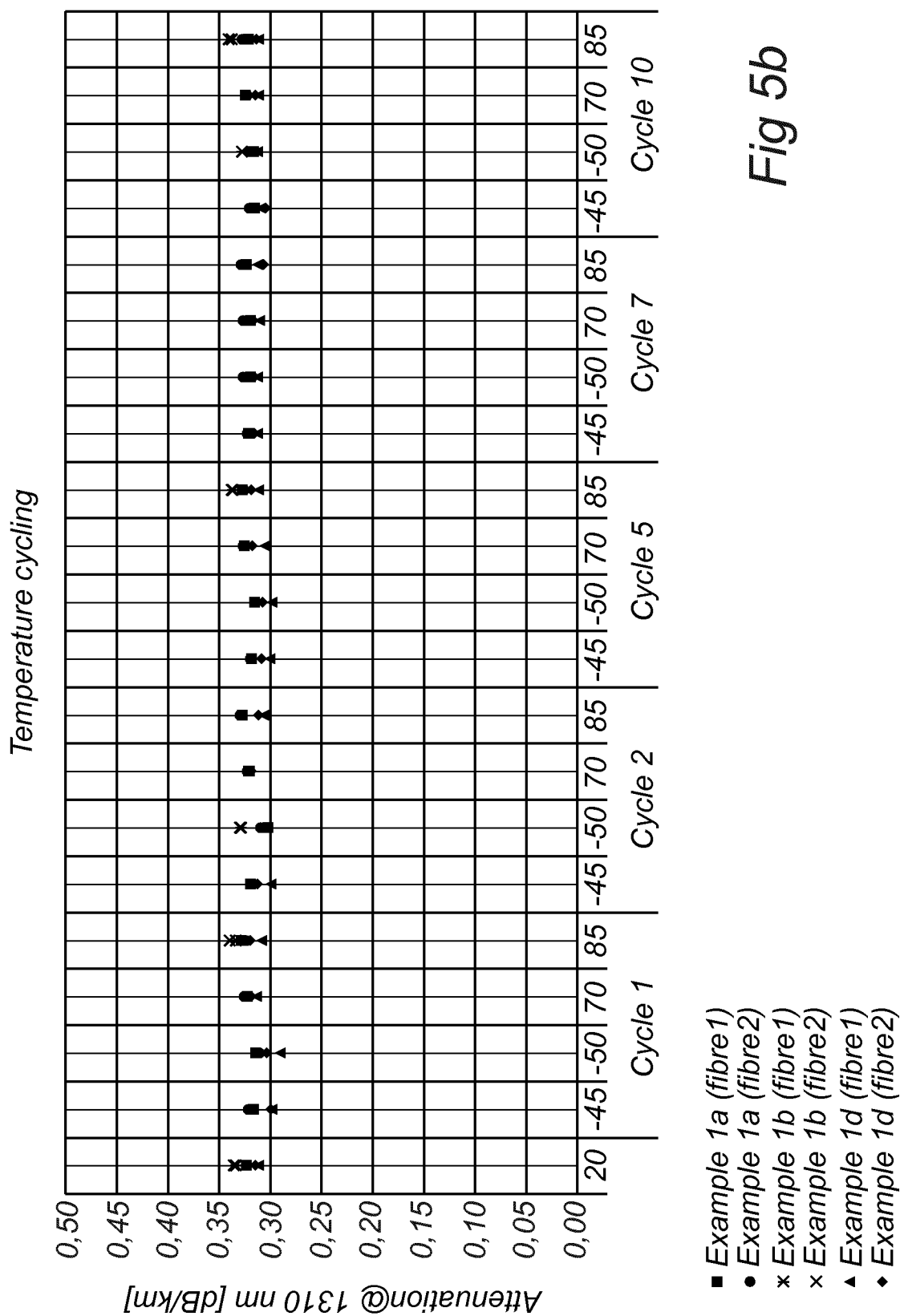

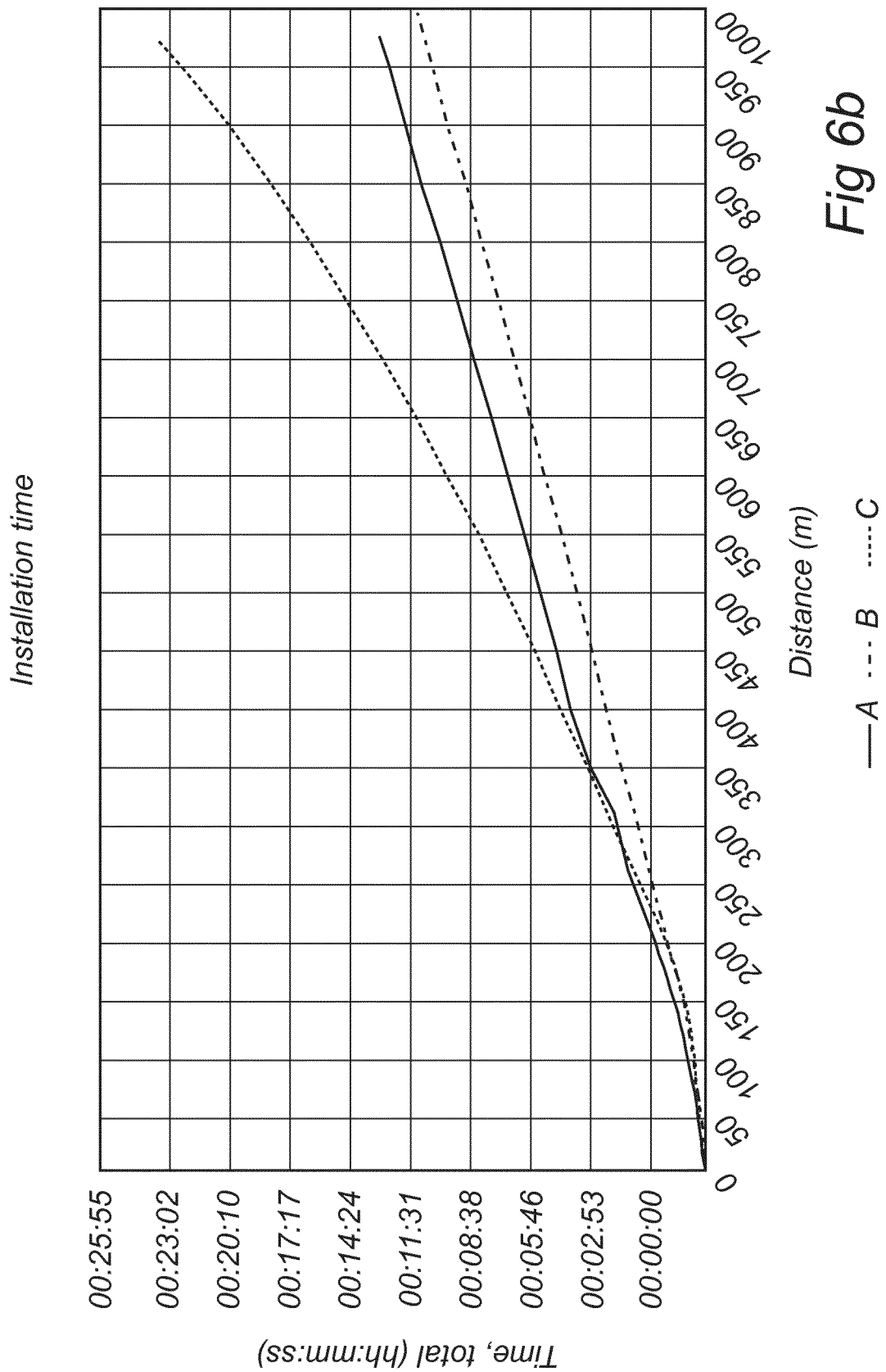

CABLE SHEATH MATERIAL

CROSS REFERENCE TO RELATED APPLICATIONS

This application is a 35 U.S.C. § 371 National Phase Entry Application from PCT Application No. PCT/EP2018/074787, filed on Sep. 13, 2018, entitled "CABLE SHEATH MATERIAL", and designating the U.S., which claims priority to European Application No. 17190947.6, filed on Sep. 13, 2017, the disclosures of which are incorporated by reference herein in their entireties.

FIELD OF THE INVENTION

The present invention relates to a cable assembly comprising one or more optical fibre(s), a method of producing a cable assembly, and to a method of installing a cable assembly into a duct by means of blowing.

BACKGROUND

Traditional telephony services have developed from use of analogue voice, to digital voice, to modem data, and to high speed digital subscriber lines. The traditional copper wires are now at the end of their lifespan as the cost for further increasing bandwidth capabilities is starting to outweigh any possible return. Copper wires are therefore being replaced by optical fibres which are able to provide much higher bandwidth than the copper wires.

An optical fibre may be provided to a building by feeding a cable assembly, containing one or more individual optical fibres, through a pre-installed tube or duct leading to the building. The ducts can for example be buried into the ground, mounted on poles above ground or located within a building. At the far side of the duct (for example inside a building to which data is to be delivered by the fibre), the fibre is to be connected to or assembled with other components.

One commonly used method for installing the cable assembly into the duct is by blowing, or by a combination of blowing and mechanical feeding, as is disclosed in EP0108590. The maximum installing length with this blowing method under favourable conditions could be as long as 2-4 km.

Normally, a cable assembly adapted for installation by means of blowing technique is composed of one or more fibres, at least one of which is a transmitting optical fibre, which are surrounded by an inner polymer layer, either in form of a thin polymer layer which surrounds a bundle of optical fibres or a thicker layer which is moulded around the optical fibres. On the outside the cable assembly is moreover provided with an outermost polymer layer and may sometimes also comprise one or more intermediate layers between the innermost and the outermost layers.

The outermost layer is important in so far as it will protect the cable assembly against abrasion and impacts as well as environmental and chemical influence, such as influence by moisture, dust and chemicals. The outermost layer is also important since its properties will to a great extent determine the air blowing performance of cable assembly. Relevant to the blowing performance are inter alia the friction coefficient of the outermost layer, the balance between the rigidity of the cable assembly in relation to its flexibility, its weight, its diameter in relation to the inner diameter of the duct, and its antistatic properties in relation to the material of the duct against which the outermost layer will slide during insertion.

In the prior art there are essentially three main principles for designing the outermost layer of a cable assembly intended for blow installation. A first principle is to provide a rather thick outermost layer of a foamed thermoplastic polymer, e.g. polyethylene. One advantage with a cable designed in this way is that for a small increase in weight it is achieved a large increase in diameter and a rather rough surface, which can be beneficial for causing an increased viscous drag when blowing the cable. However, foamed polymers are disadvantageous due to induction of so called microbending, causing signal attenuation. Examples of cable assemblies designed in this way are disclosed in e.g. EP0157610 and U.S. Pat. No. 495,021.

In EP0521710 and EP0646818 are disclosed designs of cable assemblies according to a second principle, wherein the outermost polymer layer, which e.g. is formed of UV-cured urethane-acrylate, is provided with particulates, hollow glass microspheres, beads, flakes or the like, which are partly or wholly embedded into the outermost layer. One advantage with such a cable assembly is that by choosing a suitable material for the particulates, the friction can be lowered, and the viscous drag increased. However, there are also several disadvantageous with an outermost layer formed in this way. For example, the attachment of particulates may cause a weakening of the surface coating, introducing incipient fractures or stress raisers, and may also cause point defined pressure damages to the optical fibres which will cause an increase of the signal attenuation. Also, the particulates can become detached during manufacturing and/or blow installation and become a danger to health for persons who might inhale them. Another disadvantage is that UV-cured urethane-acrylate provides a poor protection against moisture and chemicals.

In EP1821124 is disclosed a third principle for designing a cable assembly. Here the outermost layer is formed from a thermoplastic polymer, e.g. a high density polyethylene. One disadvantage with thermoplastic polymers in general is that their shrinkage during aging is large. A problem with applying a material having a large shrinkage onto an optical fibre is that the shrinkage may cause longitudinal contraction of the optical fibre with an increase of the signal attenuation as a result. In order to prevent this effect, the outermost polymer layer is not adhered to the inner layer, preferably an acrylate layer, such that the outer layer can slide in relation to the inner layer and hence avoid causing contraction of the optical fibre. However, this will also result in a poor protection of the inner layer, since the outer layer will be retracted adjacent connection boxes and the like, leaving a gap closest to the connection box, where the inner layer will be exposed. This may cause signal attenuation, since the inner layer normally is not designed to withstand for example moisture and chemicals. This applies e.g. to inner layers formed from acrylate.

Hence, there remains a need in the art for improved optical fibre assemblies.

SUMMARY OF THE INVENTION

It is an object of the present invention to at least partly overcome the problems of the prior art, and to provide a cable assembly having a sheath material offering desirable properties and which is suitable for installing by air blowing.

Hence, according to a first aspect, the invention provides a cable assembly adapted to be installed into a duct by means of blowing, and typically by a combination of blowing and mechanical feeding, said cable assembly comprising: at least one flexible signal transmitting member for transmitting optical signals, a first layer surrounding said at least one signal transmitting member such that at least one signal transmitting member is in touching contact with said first layer, and a second layer arranged outwardly of said first layer, said second layer being a non-thermoplastic layer comprising a non-thermoplastic, crosslinked polyethylene material.

As used herein, "thermoplastic" is understood to mean the property of a material to melt upon heating and harden upon cooling, and to be able to repeat these processes without appreciable change of properties. Thus, thermoplastic materials can be melted and molded repeatedly. A thermoplastic polymer is formed of polymer chains linked by intermolecular interactions or van der Waals forces, forming linear or branched structures, which may be amorphous or crystalline. However, a thermoplastic polymer does not exhibit any significant degree of crosslinking between polymer chains.

A non-thermoplastic material, on the other hand, does not melt upon heating. A non-thermoplastic material may be a thermosetting or thermoset material. As used herein, "thermosetting" is understood to refer to the property of a material, such as a polymer, of being capable of forming a three-dimensional network, by formation of permanent chemical bonds between different polymer chains or different part of the same polymer chain (crosslinks). Further, as used herein, "thermoset" refers to a material that has already reacted, or cured, to form such a three-dimensional network of crosslinked polymer chains.

In embodiments of the present invention; the second, non-thermoplastic layer of the cable assembly may have a degree of crosslinking of at least 15%, preferably at least 30%, as determined according to Swedish standard SS-EN ISO 10147:2012, which refers to international standard ISO 10147:2011.

The thermoplastic properties of a material may be tested by subjecting the material to heat as described further below. In contrast to a thermoplastic material, a non-thermoplastic material will not melt when subjected to heating, but substantially retain its physical shape.

For cables, hot set cable testing may be used to evaluate thermoplastic or thermoset properties of the cable sheath material.

By the above-described cable assembly, it is possible to achieve an optical cable assembly which provides excellent protection of the optical fibres against moisture and chemicals and high resistance to wear, while offering surprisingly good blow characteristics, which makes it well adapted to be installed into a tube or duct by means of a combined air blowing and mechanically feeding technique according to e.g. EP0108590.

As used herein, adapted to be installed into a duct by blowing, or a combination of blowing and mechanical feeding" means that the cable assembly has characteristics which allow an acceptable air blowing installation performance. Generally, cable assemblies suitable for air blow installation should be of small diameter and low weight, exhibit a certain flexural rigidity to enable mechanical feeding, while still having some flexibility, and the outer layer should exhibit a low friction coefficient, and low antistatic properties in relation to the material of the duct (usually polyethylene). More specifically, in contrast to cable assemblies intended to be installed by other methods, cable assemblies intended for installation into a duct by blowing may typically have a maximum diameter of less than 2 mm, and often less than 1.5 mm, which implies that the layers surrounding the signal transmitting members are required to be very thin. The outer layer, or sheath, of cable assemblies intended for installation into a duct by blowing typically has a maximum layer thickness of 400 µm, and often less, such as 200 µm or less, for example about 190 µm. The layer may be of substantially uniform thickness in the circumferential direction around the cable assembly. However, alternative, non-smooth surface designs are also conceivable, as described further below.

A great advantage of the present cable assembly is that the non-thermoplastic second layer exhibits virtually no shrinking or length variation, neither caused by aging nor by varying ambient temperatures. For instance, the cable assembly may exhibit a shrinkage of 0.5% or less, preferably 0.2% or less, as determined according to the standard IEC 60811-503 during 5 cycles of 1 hour each, using a temperature of +100° C.

As a result, the second layer can be adhered to the inner layer, without the risk of increasing the signal attenuation in the optical fibre(s) due to contraction. Accordingly, the boundary between the first and second layers will be sealed against moisture and chemicals, which is beneficial for the long-time durability of the cable assembly. At the same time, the second layer can provide the desired rigidity which favours a good installation performance when blowing is combined with mechanical feeding.

Moreover, a non-thermoplastic second layer based on polyethylene generates very little static electricity when sliding against the inner surfaces of ducts also made from polyethylene, which is the preferred material for tubes or ducts adapted for laying into the ground.

In embodiments, the second layer may further comprise a non-crosslinked polyethylene, typically high density polyethylene (HDPE). A non-crosslinked polyethylene, i.e., a thermoplastic polyethylene, may be added to modify one or more properties of the outer layer, in particular the density. For instance, HDPE may be added to increase the density of the second layer in cases where the crosslinked polyethylene is based on a material having a lower density than the HDPE. A non-crosslinked polyethylene may for example be present at a content of from more than 0% to 50% by weight of the second layer, for instance from 10% to 50%, from 10% to 40%, or from 20 to 50%, or from 20% to 40%, for instance about 25%, by weight of the second layer. The content of thermoplastic polyethylene in the second layer is not so high as to result in the second layer as such being thermoplastic.

The crosslinked polyethylene may be based on a low density, medium density, or high density polyethylene. In embodiments, the crosslinked polyethylene may be based on a material having a density in the lower end of the range usually considered as medium density, or a density in the upper range of what is typically considered to represent low density for polyethylenes. In the following, such materials are referred to as low-to-medium density polyethylene.

In embodiments of the cable assembly, the crosslinked polyethylene may be based on a low density polyethylene or a medium density polyethylene (thus also including low-to-medium polyethylene as defined above), and the second layer may further comprise non-crosslinked polyethylene of higher density, in particular HDPE, at a content of from 20% to 50% by weight of the second layer, for instance from 30% to 50%, or from 40% to 50% by weight based on the weight of the second layer.

In embodiments, the polyethylene content of the second layer (including the crosslinked polyethylene, and any further polyethylene contained in the second layer), in total exhibits a density in the range of from 920 to 960 kg/m$^3$, for example from 926 to 960 kg/m$^3$, or from 930 to 960 kg/m$^3$, or from 930 to 950 kg/m³, or from 920 to 950 kg/m³, as determined according to Swedish standard SS-EN ISO 1183-1:2012 which refers to international standard ISO 1183-1:2012.

In embodiments, the crosslinked polyethylene may be a silane-crosslinked polyethylene, a peroxide-crosslinked polyethylene, or a polyethylene crosslinked by gamma radiation. Various base materials and catalyst systems using these mechanisms are commercially available. In particular, the crosslinked polyethylene material may be a silane-crosslinked polyethylene.

In embodiments of the cable assembly, the material of the second layer may be homogeneous. This means that the second layer may be free of any items such as beads, balls, flakes, fibres or the like, such items being neither partly nor wholly embedded into the outermost polyethylene layer. For the purpose of this patent application, a particulate is a non-microscopic particle or item, i.e. a particle or item of a size such that is visible to the naked eye.

In embodiments of the cable assembly, the second layer is formed with essentially the same thickness over the entire cable assembly.

In embodiments of the cable assembly, the outer surface of the outermost layer may be essentially smooth, without any additionally formed indentations, projections, grooves, ridges or the like. In other embodiments of the cable assembly, the outer surface of the second layer may be provided with ridges in a longitudinal direction of the cable assembly. Additionally or alternatively, the second layer may be provided with grooves in a longitudinal direction of the cable assembly.

In embodiments of the cable assembly, the second layer may be adhered to the first layer.

In embodiments, the cable assembly may comprise at least two flexible signal transmitting members for transmitting optical signals.

In embodiments the cable assembly may have a flexural rigidity of 30 $\mu Nm^2$ or more. For example, a cable assembly comprising at least two fibres may have a flexural rigidity of at least about 30 $\mu Nm^2$. A cable assembly comprising at least three fibres may have a flexural rigidity of at least about 60 $\mu Nm^2$.

In a second aspect, there is provided a method of manufacturing a cable assembly comprising at least one flexible signal transmitting member for transmitting optical signals, comprising the steps of:
a) providing at least one signal transmitting member coated with a first layer;
b) providing a molten composition comprising at least one crosslinkable thermosetting polyethylene and optionally a crosslinking agent;
c) applying said molten composition around said at least one signal transmitting member to form a second layer of said molten composition outwardly of said first layer; and
d) allowing said crosslinkable thermosetting polyethylene of the thus formed second layer to crosslink.

The crosslinking of said crosslinkable thermosetting polyethylene may require the action of one or more crosslinking agent(s) and/or conditions selected from the group consisting of: a catalyst, heat, moisture, UV radiation and gamma radiation. Step d) may involve subjecting the second layer to one or more such condition(s), for instance heat or gamma radiation, or heat and humidity.

In embodiments where the thermosetting polyethylene is crosslinkable using a catalyst, step b) may further comprise mixing said crosslinkable thermosetting polyethylene and said catalyst. For instance, the polyethylene and the catalyst may be mixed in a dry state to form a mixture, and said mixture is subsequently melted.

In embodiments, the thermosetting polyethylene may be a silane-crosslinkable polyethylene and a silane catalyst may be mixed with said thermosetting polyethylene or added to said molten composition.

In another aspect, the invention provides a method of installing a cable assembly as described above into a duct, comprising introducing said cable assembly into and through said duct by means of a combination of blowing using compressed air and mechanical feeding.

It is noted that the invention relates to all possible combinations of features recited in the claims.

BRIEF DESCRIPTION OF THE DRAWINGS

The invention will hereinafter be described in detail by reference to exemplary embodiments as illustrated in the following drawings, in which:

FIGS. 5a and 5b show the results of measurements of signal attenuation in cable assemblies during variation of the temperature.

FIGS. 6a and 6b are graphs illustrating the result of a blow installation test performed with cable assemblies according to embodiments of the invention.

DETAILED DESCRIPTION OF EMBODIMENTS

Figure 1A:
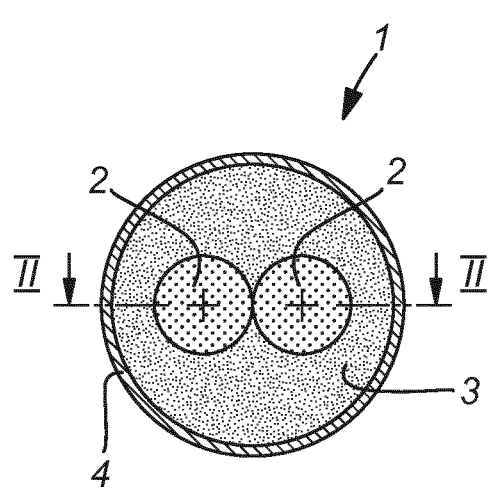
FIG. 1A-1C schematically show cross sections through cable assemblies according to the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. As illustrated in the figures, the sizes of layers and regions may be exaggerated for illustrative purposes and, thus, are provided to illustrate the general structures of embodiments of the present invention. Like reference numerals refer to like elements throughout.

Figure 1B:
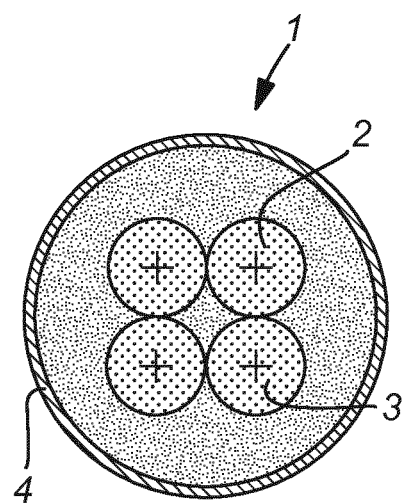
Figure 1C:
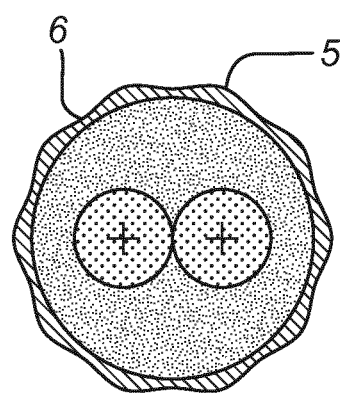

FIGS. 1A to 1C are illustrated cross-sections of different conceivable embodiments of a cable assembly 1 according to the invention. In FIG. 1A the cable assembly comprises two optical fibres 2, which are embedded in an innermost polymer layer 3, preferably made from UV-cured acrylate. Outside of the innermost polymer layer 3 the cable assembly is provided with a non-outermost layer 4, which is designed to protect the cable assembly and give it the best possible characteristics for blow installation within a cable duct. The outermost layer is non-thermoplastic, and comprises a crosslinked polyethylene.

For the purpose of this patent application, the terms cable and cable assembly are used interchangeably.

In embodiments, one of the two optical fibres 2 may be replaced with a non-transmitting filler fibre, such that the assembly 1 comprises only one transmitting optical fibre. It is furthermore contemplated that a cable assembly according to embodiments of the invention may comprise any suitable number of optical fibres and, if desired, one or more additional filler fibres. For instance, in some embodiments the cable assembly may contain two optical fibres and a filler fibre. In other embodiments, the cable assembly may comprise three, four, five, six, seven, eight or twelve optical fibres, and optionally one or more filler fibres. Often the filler fibre will be of the same material as the transmitting fibre(s), such that its contribution to the stiffness of the assembly will correspond to the contribution of a transmitting fibre.

Figure 2:
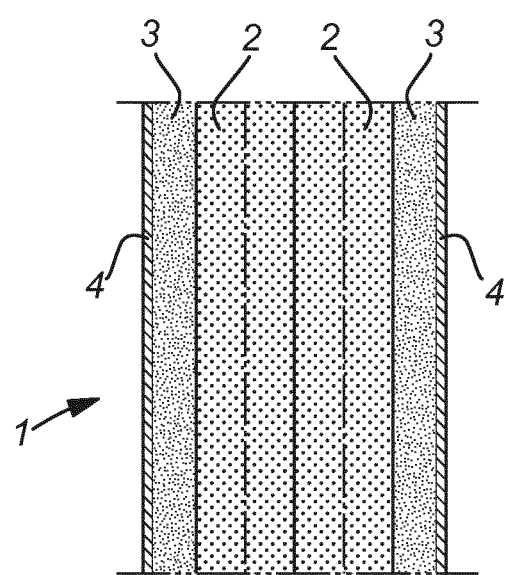
FIG. 2 show a longitudinal section along the line II-II in FIG. 1A.

FIG. 1B illustrates an alternative embodiment of the cable assembly, comprising four optical fibres 2. Besides a somewhat larger diameter, it has a similar structure as the embodiment in FIG. 1A. The embodiments according to FIGS. 1A and 1B are each formed with a smooth outer surface, which is generally circular in cross-section and has a uniform thickness in a longitudinal direction, as is apparent from the longitudinal section in FIG. 2, taken along the line II-II in FIG. 1A. However, it could also be conceivable to provide the outer surface of the cable assembly with wave formations transverse to its longitudinal axis or, as is illustrated in FIG. 1C, ridges 5 and/or grooves 6 in parallel to its longitudinal axis, in order to increase the drag from the airflow and/or lower the friction during installation.

A cable assembly as described above may have an outer diameter of less than 2 mm, typically about 1.5 mm or less. For example, a 12-fibre cable assembly may have a maximum diameter of 1.4 mm, whereas a cable assembly incorporating fewer fibres (e.g. up to three fibres, including any filler fibre) may have a slightly smaller diameter, such as less than 1.2 mm, or about 1.1 mm. The diameter values refer to the maximum outer diameter, which in cases where the outer layer 4 is provided with waves or ridges and/or grooves as depicted in FIG. 1C means the diameter including the top of a ridge.

The outer layer 4 of a cable assembly as described above may have a layer thickness of 400 μm or less, such as about 200 μm or less. In embodiments, the outer layer may have a thickness of about 190 μm. As indicated above, the outer layer may have a uniform thickness around the circumference of the assembly, such that the outer layer would have a uniform thickness of 400 μm or less, 200 μm or less, or about 190 μm, all around the circumference.

In embodiments where the outer layer 4 is designed to have a non-uniform thickness in the direction transverse to the longitudinal axis of the assembly (e.g. as depicted in FIG. 1C), the layer may have a thickness of 400 or less measured at the thickest portion of the layer (e.g., at a ridge).

Alternatively, in embodiments where the outer layer 4 is designed to have a non-uniform thickness in the direction transverse to the longitudinal axis of the assembly (e.g. as depicted in FIG. 1C), the layer may have a thickness of 100 μm or more, e.g. about 190 μm, measured at the thinner portion of the layer (e.g., at a valley or indent).

With regard to the dimensions of the cable assembly and its layers, a deviation of up to 10%, or up to 5%, or up to 1%, of an indicated numerical value (e.g. a thickness) at any individual point of measurement, may be acceptable.

Figure 3:
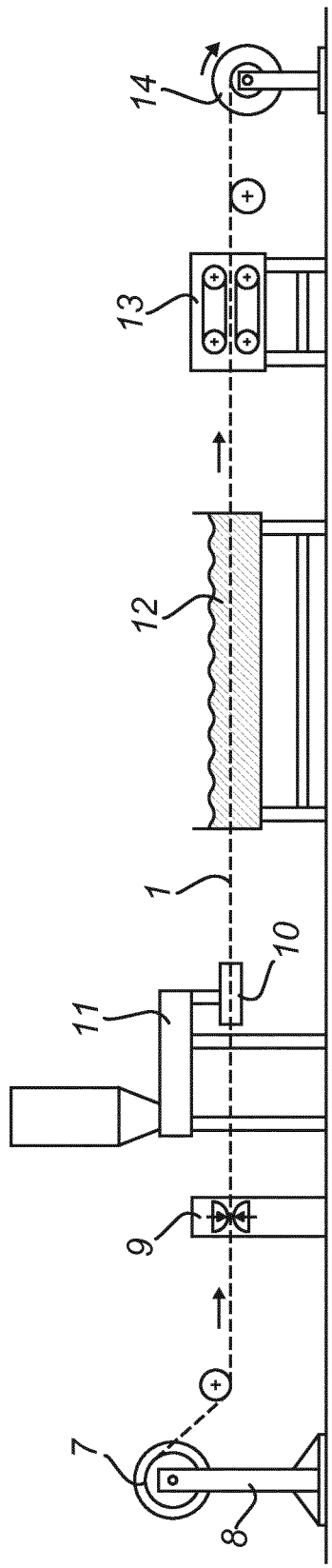
FIG. 3 is a schematic representation of equipment for applying an outermost polymer layer of the cable assembly.

A cable assembly according to the invention may be manufactured by means of extrusion through at least one extruder 11 as illustrated in FIG. 3. Firstly, primary coated two or more optical fibres are embedded into a first polymer layer, typically of acrylate, by conventional means to form the innermost layer 3 which is typically cured in a subsequent curing station. From there, the primary assembled optical fibres surrounded by the innermost layer can be fed directly to a second extruder for application of the second, outermost layer 4, or, as is normally the case, may be wound up on a reel 7. In the latter case, when the second, outermost layer is to be applied onto the first, innermost layer, the reel is placed in a pay-off stand 8, as is illustrated in FIG. 3. The thread containing the optical fibres is then fed from the reel through a tension regulating device 9, to an extrusion head 10 of an extruder 11. In the extruder, the materials intended to form the second, outermost layer are melted and mixed to provide a melted composition, including, if applicable, a crosslinking agent. The melted composition is fed to the extrusion head 10, where it is applied to the outside of the thread of optical fibres and the innermost layer. The thread of optical fibres and the innermost layer is fed through the extrusion head 10. The melted composition, comprising the crosslinkable polyethylene, is applied onto the innermost layer such that the polyethylene layer will be adhered to the innermost layer due to the pressure under which it is applied in the extrusion head 10. From the extrusion head the now completed cable assembly is fed through one or more water troughs 12 for subsequent cooling of the outermost polyethylene layer. The subsequent cooling secures an adhesion of the polyethylene layer to the underlying layer.

For the purpose of this patent application, the terms "adhesion" and "adherence" are used interchangeably. For further clarification, with adhesion is not meant a permanent bonding; rather, that the layers adhere to each other enough to stay together during a blowing installation procedure, but may be easily separated and removed from each other, e.g. using a suitable tool, such as to expose the optical fibres at the end of the cable. A tube-like end part of the second layer can thus be removed from the first layer.

Next, the cable assembly is passed through a pulling device 13 which pulls the cable assembly 1 through the extrusion device and is subsequently wound up on a second reel 14.

The melted composition is typically formed by mixing the ingredients in a solid state, such as in the form of granules, and melting the solids to form a melted composition. The ingredients include a polyethylene base material, also referred to as a thermosetting polyethylene, adapted to be crosslinked, or cured, by the action of one or more crosslinking agent(s) and/or conditions, such as a catalyst, radiation (e.g. gamma radiation), humidity or presence of water, and/or heat. In embodiments where crosslinking of the polyethylene material requires the use of a catalyst, the catalyst may be mixed, typically in a solid state in the form of a particulate, with the polyethylene base material in a mixing vessel of the extruder equipment. Other possible ingredients include a further polyethylene material and conventional additives.

The polyethylene base material is adapted to be crosslinked, meaning that it is designed to be capable of forming crosslinks between adjacent polymer chains under certain conditions. Such conditions may be one or more of an elevated temperature and/or pressure, presence of water, or electromagnetic radiation. For instance, the polyethylene base material may be chemically modified to be capable of forming crosslinks when subjected to electromagnetic radiation, or when subjected to heating in the presence of water (humidity). In embodiments of the invention, the polyethylene base material is adapted to form crosslinks in the presence of a crosslinking agent, for instance a catalyst such as a silane based catalyst. In embodiments, the crosslinking agent may require certain reaction conditions, often heat and moisture. In embodiments where crosslinking requires the presence of a crosslinking agent, part of the crosslinking agent, and/or of any other reactant present, may remain in the crosslinks formed. For instance, in embodiments of the invention employing a silane catalyst to crosslink the polyethylene base material, the crosslinks of the resulting crosslinked polyethylene material may contain silicon atoms (Si).

Examples of suitable polyethylene base materials include base materials for crosslinked polyethylene, which is usually referred to as PEX or XLPE. PEX base materials are commercially available from various suppliers, and are typically supplied with instructions for crosslinking, and with a catalyst where required. As indicated above, PEX base materials are specifically designed to be capable of crosslinking, in contrast to polyethylene materials in general, including high density polyethylene, which do not contain a significant degree of crosslinking and hence are thermoplastic. PEX materials are usually classified as PEX type A, type B or type C, based on the crosslinking mechanism. Type A refers to crosslinking by peroxide, type B refers to crosslinking by silane, and type C refers to crosslinking by electron beam.

Generally, PEX materials may be based on polyethylene of low density, medium density, or high density. In the present invention, a relatively high density, e.g. at least 926 $kg/m^3$, of the second, outermost layer is preferred as it provides a desirably high rigidity to the assembly. The density of the second layer as a whole is determined by the respective densities and contents of all its components, and in particular all polyethylene components, as such materials form the major part of the composition of the layer. Using PEX as the sole polyethylene component, it is preferred that the PEX is based on a medium or high density polyethylene. However, when using a PEX in combination with an additional non-crosslinkable polyethylene, in particular HDPE as described in more detail below, also PEX materials based on low density polyethylene (e.g. below 926 $kg/m^3$, such as from 910 to 926 $kg/m^3$) may be useful.

As used herein, "PEX based on low density polyethylene" refers to PEX based on polyethylene having a density of less than 926 $kg/m^3$, typically in the range of from 910 $kg/m^3$ to less than 926 $kg/m^3$. Furthermore, "PEX based on high density polyethylene" refers to PEX based on polyethylene having a density of at least 935 $kg/m^3$, such as in the range of from 935 $kg/m^3$ to 970 $kg/m^3$, e.g. 940 $kg/m^3$ to 960 $kg/m^3$. Thus, in this context, "medium density" refers to a density in the range of from 926 $kg/m^3$ to less than 935 $kg/m^3$.

Thus, in embodiments, the cable sheath material may comprise, optionally as the sole polyolefin component, a PEX based on high density polyethylene having a density of at least 935 $kg/m^3$.

Alternatively, instead of combining a low density PEX, or a low-to-medium density PEX, with another polyethylene component increasing the density of the layer, a second layer comprising low density or low-to-medium density PEX as the sole polyethylene component may be provided at a slightly increased thickness, such as above 190 μm, or between 200 μm and 400 μm. It is also envisaged that these two strategies (increasing density and increasing layer thickness, respectively) may be used in combination, and that either, or both, may be combined with other means of increasing the stiffness of the assembly, e.g. by including one or more filler fibre(s) or other reinforcement in the assembly.

In embodiments, the polyethylene content of the second layer may have a density e.g. in the range of from 926 $kg/m^3$ to 960 $kg/m^3$. The second layer as such i.e., including any additives, fillers etc. that may optionally be present, may have a density in the range of from 910 $kg/m^3$ to 960 $kg/m^3$, such as from 920 $kg/m^3$ to 950 $kg/m^3$. Many additives, for instance pigments and mineral fillers, typically have a density that is lower than the density of polyethylene materials. The melted composition may also have a density in the range of from 910 $kg/m^3$ to 960 $kg/m^3$, such as from 920 $kg/m^3$ to 950 $kg/m^3$.

The second layer is typically non-porous, e.g. not foamed. The density of the layer may be calculated based on the material components of the composition used for forming the second layer.

In embodiments where the crosslinked polyethylene alone does not provide the desired rigidity to the outer layer of a cable assembly, the cable assembly may be modified by other means to exhibit the flexural rigidity required for blow installation applications; for instance, additional suitable filler fibres may be included.

The polyethylene base material, where applicable together with a suitable catalyst, may constitute from 50% to 100% by weight of the polyethylene content of the melted composition, that is, excluding any additives. Any additives may be present in conventional amounts as appreciated by persons of skill in the art.

In embodiments, a further polyethylene material may be mixed with the crosslinkable (thermosetting) polyethylene. Such a further polyethylene material is typically non-crosslinkable, meaning that it is not intended to be crosslinked, and is incapable of forming any significant degree of crosslinking under any conditions, or at least under conditions allowing crosslinking of the crosslinkable (thermosetting) polyethylene base material. Such a further polyethylene may be, as such, a thermoplastic polyethylene. A typical example of a further polyethylene useful in embodiments of the invention include HDPE.

Where present, the further polyethylene may represent from 5% to 60%, and preferably from 20% to 50%, by weight of the melted composition, or by weight of the second layer.

According to the invention, the second layer is typically non-thermoplastic, despite the presence of a certain amount (e.g. up to 50% by weight of the polyethylene content) of a non-crosslinked polyethylene. The non-thermoplastic property may be verified using a melt test as described in example 2 below.

The thermosetting properties of the second layer are attributed to the degree of crosslinking, which may be at least 15% as determined according to ISO 10147:2011.

A higher content of crosslinkable polyethylene material, such as PEX, in relation to the content of non-crosslinkable polyethylene, such as HDPE, may favour a higher degree of crosslinking, although it is appreciated that the degree of crosslinking may also depend on the type and content of any catalyst, if required, and other processing conditions, such as cooling conditions and line speed. Factors influencing the degree of cross-linking are known to the person of skill in the art and may also be found in PEX suppliers' instructions for use of the material.

In embodiments, the degree of crosslinking, as determined according to ISO 10147:2011, may be in the range of from 15% to 80%, for instance from 20% to 70%. In some embodiments the degree of crosslinking may be in the range of from 30 to 60%, such as from 30% to 50%. In some examples the degree of crosslinking may be from 35% to 40%. In other examples, the degree of crosslinking may be in the range of from 40% to 80%, such as from 50% to 80%, such as from 50% to 70% or from 40% to 60%, or from 50% to 60%.

The thermoplastic properties of a polyethylene material can be tested using a method as described below.

Optionally the second layer may contain conventional additives such as mineral fillers (e.g. titanium dioxide, calcium carbonate), colorants, friction reducing agents (slip agents), and the like. In such embodiments, one or more additives may be may also be mixed with the polyethylene base material prior to extrusion; for instance, one or more additives may be added to the melted composition, or added in dry form to the polyethylene base material before melting. Additives may be added in conventional amounts, for instance up to 10% by weight of the total composition.

EXAMPLES

Example 1: Preparation of Coated Cable Assemblies

Example 1a: Low-to-Medium Density PEX+HDPE

Ingredients as outlined in Table 1a below were weighed and mixed in dry state prior to heating in an extruder to form a melted composition.

TABLE 1a

| Material | Weight content |
| --- | --- |
| PEX base material (silane-crosslinkable polyethylene, low-to-medium density) | 41.2% |
| Catalyst masterbatch (low density polyethylene, copolymerised with vinyl silane) | 4% |
| HDPE | 50% |
| Colorant | 0.8% |
| Slip agent | 4% |
| Total amount | 100% |

The PEX material was based on a medium density polyethylene having a density in the lower end of the range usually considered as medium density.

The melted composition was extruded to form a second layer of a cable assembly essentially as described above with reference to FIG. 3, referred to as Sample 2. Also the same composition was extruded to form a second layer of a second cable assembly, referred to as Sample 3, essentially as described above with reference to FIG. 3 except that the cable assembly in addition to the two optical fibres also comprised a filler fibre. Each fibre (also the filler fibre) had a diameter of 0.25 mm. Each assembly had a total diameter of approximately 1.1 mm. The layer thickness of the second layer was approximately 0.19 mm (190 μm).

Example 1b: High Density PEX

Ingredients as outlined in Table 1b below were weighed and mixed in dry state prior to heating in an extruder to form a melted composition.

TABLE 1b

| Material | Weight content |
| --- | --- |
| PEX base material (silane-crosslinkable polyethylene, high density) | 90% |

TABLE 1b-continued

| Material | Weight content |
| --- | --- |
| Catalyst masterbatch | 5% |
| Colorant | 1% |
| Slip agent | 4% |
| Total amount | 100% |

The melted composition was extruded to form a second layer of a cable assembly essentially as described above, having two optical fibres. Each fibre had a diameter of 0.25 mm, and the assembly had a total diameter of approximately 1.1 mm. The layer thickness of the second layer was approximately 0.19 mm (190 μm).

The melted composition was extruded to form a second layer of a cable assembly essentially as described above with reference to FIG. 3, referred to as Sample 4. Also the same composition was extruded to form a second layer of a second cable assembly, referred to as Sample 5, essentially as described above with reference to FIG. 3 except that the cable assembly in addition to the two optical fibres also comprised a filler fibre. Each fibre (also the filler fibre) had a diameter of 0.25 mm. Each assembly had a total diameter of approximately 1.1 mm. The layer thickness of the second layer was approximately 0.19 mm (190 μm).

On a sidenote, for the purpose of producing a cable sheath material using as base material PEX based on medium density polyethylene, the same materials as shown in Table 1b may be used, at essentially the same weight contents, with the exception that the PEX base material would be silane-crosslinkable polyethylene of medium density instead.

Example 1c: Low-to-Medium Density PEX

Ingredients as outlined in Table 1c below were weighed and mixed in dry state prior to heating in an extruder to form a melted composition.

TABLE 1c

| Material | Weight content |
| --- | --- |
| PEX base material (silane-crosslinkable polyethylene, low-to-medium density) | 91.2% |
| Catalyst masterbatch (low density polyethylene, copolymerised with vinyl silane) | 4% |
| Colorant | 0.8% |
| Slip agent | 4% |
| Total amount | 100% |

The PEX material was based on a medium density polyethylene having a density in the lower end of the range usually considered as medium density.

The melted composition was extruded to form a second layer of a cable assembly essentially as described above, having two optical fibres. Each fibre had a diameter of 0.25 mm, and the assembly had a total diameter of approximately 1.1 mm. The layer thickness of the second layer was approximately 0.19 mm (190 μm). This cable assembly was referred to as Sample 6.

Example 1d: Comparative Cable Assembly Using Thermoplastic HDPE

A cable assembly essentially as described above was prepared, except that the second layer was formed of a thermoplastic material of non-crosslinked high density polyethylene and did not contain any PEX material. This cable assembly was referred to as Sample 1.

Example 2: Melt Test

Figure 4A:
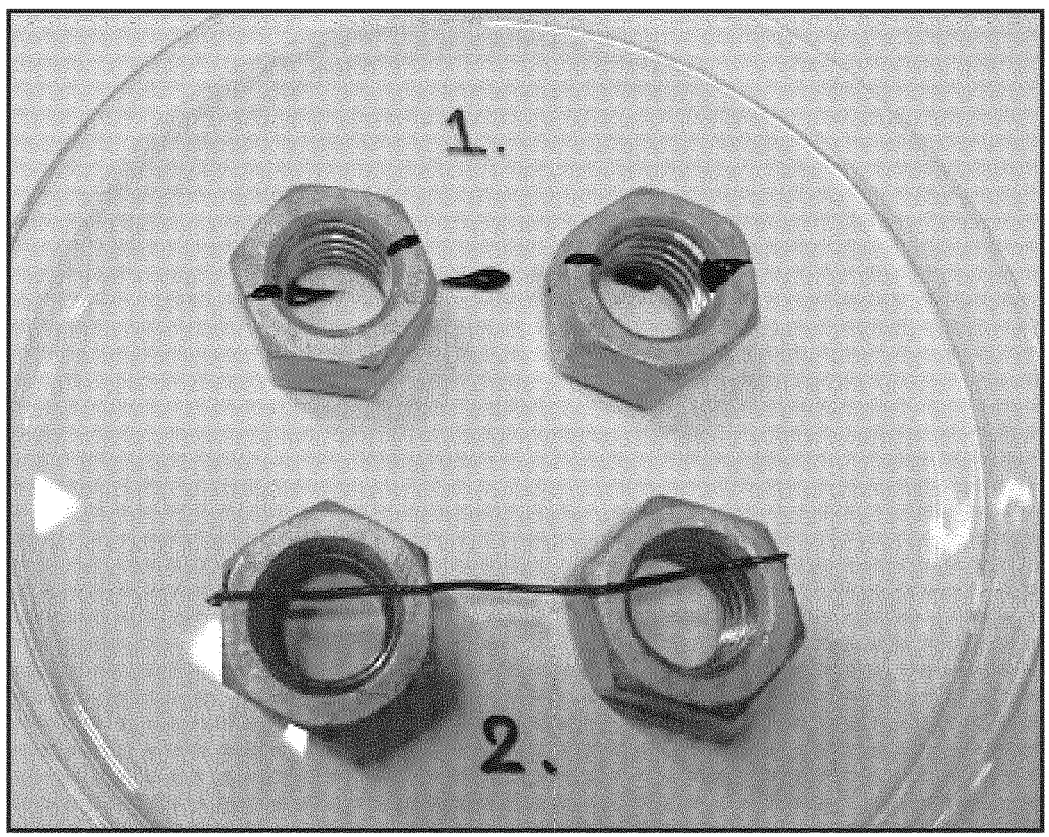
FIGS. 4a and 4b are photographs showing the result of melt tests.
Figure 4B:
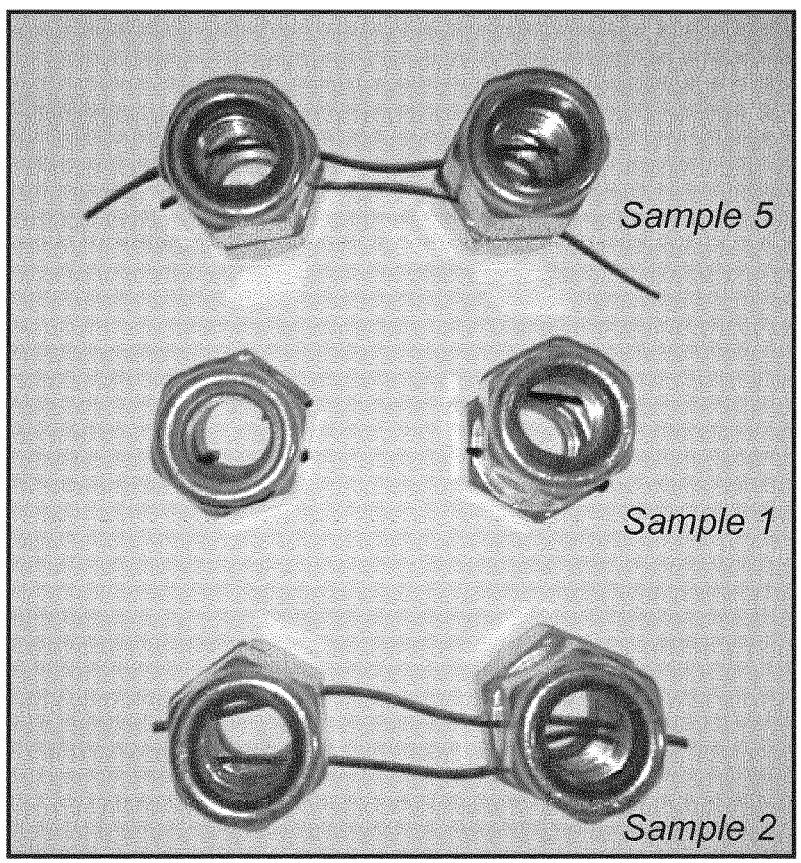

The sheaths (the second layer) of Samples 1 and 2 each having a length of about 10 cm were stripped from the respective cable assembly and placed in a heating chamber, each sheath suspended between two supports. The temperature in the heating chamber was 150° C. After 48 hours the samples were visually inspected. A photograph of the result is shown in FIG. 4a. The test was repeated using samples 1, 2 and 5, and the result shown in FIG. 4b. In both tests it was seen that the sheath material of Sample 1, that is the thermoplastic layer, was completely melted, whereas the second layer of each of Sample 2 and Sample 5, formed of a non-thermoplastic layer comprising a non-thermoplastic, crosslinked polyethylene material, essentially retained its shape and did not melt.

Example 3: Stiffness

The bending stiffness of Samples 2, 3 and 5, respectively, was investigated by a buckling bend test according to IEC 60794-1-21, method E17C, which was modified to better fit air blown fibre (ABF) products as follows:

A sample having a length of 100 mm was placed in a slightly bent vertical position between two horizontal metal plates, each covered with a plastic plate fixed on the inward facing surface. Each plastic plate had a groove into which the respective end of the sample was inserted. The samples were slightly bent by hand by pressing the cable ends together to form a slightly bent shape and mounted in that position between the plates using the grooves. After 60 seconds of compressing, the force and the bending radius are measured. The stiffness (B), measured in $\mu Nm^2$, of the sample is calculated using the formula $$B = F \times \pi \times r^2$$

where F=bending force given by the scale, r=bending radius

At a bending radius of 15 mm, a sample length of 100 mm and measuring the force after 60 seconds of bending, average stiffness values were obtained as presented in Table 2.

TABLE 2

| Sample | Average stiffness (n = 4) [$\mu Nm^2$] |
|---|---|
| 2 (2 fibres) | 35 |
| 3 (3 fibres (2 + 1)) | 63 |
| 5 (3 fibres (2 + 1)) | 59 |

Example 4: Shrink Tests

Samples 1, 2 and 5 above (n=2) were subjected to shrinkage measurement according to the standard IEC 60811-503 using the following settings; temperature +100° C., number of cycles: 5, time per cycle: 1 h. The results showed that the comparative sample 1, which had a sheath of thermoplastic material, exhibited an average shrinkage of 3.0%, whereas inventive samples 2 and 5, with a non-thermoplastic sheath, each had an average shrinkage of 0.1% as shown in Table 3 below.

TABLE 3

| Sample | Average shrinkage (n = 2) [%] |
|---|---|
| Comparative sample | 3.0 |
| Sample 2 | 0.1 |
| Sample 5 | 0.1 |

Example 5: Optic Attenuation 2-fiber cable assemblies prepared according to Example 1 a (i.e. Sample 2), Example 1 b (Sample 4) and Example 1d (Sample 1), each having a length of 1000 m were wound up into a plastic pan and placed in a temperature cycling chamber. Two specimens per sample type were tested (denoted "fibre1" and "fibre2" respectively). The cable ends were prepared for measurements of the attentuation of the optical signal. The temperature cycle involved 12 hour dwell time at each of the temperatures −45° C., −50° C., +70 and +85° C. Attenuation measurements at wavelengths 1310 nm and 1550 nm started at room temperature (+20° C.) and were performed during cycle 1, 2, 5, 7 and 10, at the temperatures indicated above in respect of Samples 1 and 2. For the cable assembly of Example 1b (Sample 4), attenuation measurements were made only at temperatures +85° C. and −50° C. during cycle 1, 2, 5 and 10. Measurements were made using an optical time-domain reflectometer (OTDR) from Anritsu, model MW9076K.

The results are presented numerically in Tables 4a and 4b below and graphically in FIG. 5a (attenuation at 1310 nm) and FIG. 5b (attenuation at 1550 nm). It was found that the performance of the inventive cable assemblies with regard to attenuation of the optical signal is similar to the performance of the comparative cable assembly.

TABLE 4a

| | Optic attenuation at 1310 nm | | | | | | | | | | | |
|---|---|---|---|---|---|---|---|---|---|---|---|---|
| | Temp. (° C.) | | | | | | | | | | | |
| | 20 | −45 | −50 | 70 | 85 | −45 | −50 | 70 | 85 | −45 | −50 | 70 | 85 |
| | | Cycle 1 | | | | Cycle 2 | | | | Cycle 5 | | | |
| Ex. 1a (fibre1) | 0.324 | 0.317 | 0.315 | 0.323 | 0.329 | 0.320 | 0.303 | 0.322 | 0.328 | 0.319 | 0.316 | 0.326 | 0.328 |
| Ex. 1a (fibre2) | 0.324 | 0.322 | 0.311 | 0.326 | 0.324 | 0.319 | 0.310 | 0.323 | 0.330 | 0.320 | 0.315 | 0.327 | 0.326 |
| Ex. 1b (fibre1) | 0.334 | | | | 0.334 | | 0.329 | | | | | | 0.337 |
| Ex. 1b (fibre2) | 0.336 | | | | 0.340 | | 0.330 | | | | | | 0.338 |
| Ex. 1d (fibre1) | 0.312 | 0.299 | 0.291 | 0.314 | 0.309 | 0.300 | 0.310 | 0.321 | 0.307 | 0.301 | 0.299 | 0.306 | 0.312 |
| Ex. 1d (fibre2) | 0.315 | 0.300 | 0.304 | 0.319 | 0.320 | 0.313 | 0.306 | 0.319 | 0.312 | 0.309 | 0.308 | 0.318 | 0.319 |

TABLE 4a-continued

Optic attenuation at 1310 nm

| | Temp. (° C.) | | | | | | | |
|---|---|---|---|---|---|---|---|---|
| | −45 | −50 | 70 | 85 | −45 | −50 | 70 | 85 |
| | Cycle 7 | | | | Cycle 10 | | | |
| Ex. 1a (fibre1) | 0.322 | 0.320 | 0.320 | 0.324 | 0.316 | 0.317 | 0.325 | 0.322 |
| Ex. 1a (fibre2) | 0.323 | 0.327 | 0.327 | 0.329 | 0.321 | 0.322 | 0.323 | 0.328 |
| Ex. 1b (fibre1) | | | | | | 0.328 | | 0.338 |
| Ex. 1b (fibre2) | | | | | | 0.328 | | 0.341 |
| Ex. 1d (fibre1) | 0.313 | 0.313 | 0.311 | 0.313 | 0.310 | 0.313 | 0.312 | 0.312 |
| Ex. 1d (fibre2) | 0.316 | 0.316 | 0.317 | 0.307 | 0.305 | 0.313 | 0.315 | 0.314 |

TABLE 4b

Optic attenuation at 1550 nm

| | Temp. (° C.) | | | | | | | | | | | | |
|---|---|---|---|---|---|---|---|---|---|---|---|---|---|
| | 20 | −50 | −45 | 70 | 85 | −45 | −50 | 70 | 85 | −45 | −50 | 70 | 85 |
| | | Cycle 1 | | | | Cycle 2 | | | | Cycle 5 | | | |
| Ex. 1a (fibre1) | 0.188 | 0.182 | 0.180 | 0.185 | 0.189 | 0.179 | 0.176 | 0.184 | 0.187 | 0.184 | 0.181 | 0.192 | 0.192 |
| Ex. 1a (fibre2) | 0.191 | 0.178 | 0.183 | 0.189 | 0.192 | 0.184 | 0.179 | 0.195 | 0.198 | 0.184 | 0.185 | 0.194 | 0.191 |
| Ex. 1b (fibre1) | 0.182 | | | | 0.191 | | 0.179 | | | | | | 0.187 |
| Ex. 1b (fibre2) | 0.186 | | | | 0.192 | | 0.181 | | | | | | 0.192 |
| Ex. 1d (fibre1) | 0.181 | 0.189 | 0.183 | 0.188 | 0.185 | 0.183 | 0.185 | 0.193 | 0.183 | 0.182 | 0.185 | 0.185 | 0.189 |
| Ex. 1d (fibre2) | 0.183 | 0.192 | 0.179 | 0.186 | 0.188 | 0.181 | 0.183 | 0.182 | 0.191 | 0.178 | 0.180 | 0.190 | 0.188 |

| | Temp. (° C.) | | | | | | | |
|---|---|---|---|---|---|---|---|---|
| | −45 | −50 | 70 | 85 | −45 | −50 | 70 | 85 |
| | Cycle 7 | | | | Cycle 10 | | | |
| Ex. 1a (fibre1) | 0.186 | 0.187 | 0.184 | 0.192 | 0.187 | 0.185 | 0.190 | 0.192 |
| Ex. 1a (fibre2) | 0.186 | 0.185 | 0.195 | 0.194 | 0.189 | 0.186 | 0.193 | 0.192 |
| Ex. 1b (fibre1) | | | | | | 0.177 | | 0.188 |
| Ex. 1b (fibre2) | | | | | | 0.180 | | 0.192 |
| Ex. 1d (fibre1) | 0.182 | 0.187 | 0.186 | 0.182 | 0.181 | 0.183 | 0.183 | 0.185 |
| Ex. 1d (fibre2) | 0.183 | 0.180 | 0.185 | 0.185 | 0.190 | 0.189 | 0.188 | 0.184 |

Example 6: Blow Installation

The blow installation performance of cable assemblies comprising 2 fibres prepared according to Examples 1a (Sample 2), 1 b (Sample 4) and 1 c (Sample 6) above was tested in a 5/3.5 mm duct according to to standard IEC 60794-1-21, method E24 using an Air Blown Fiber Installation Tool (LTT 179 2011). The set-up is summarized in Table 5. Installation speed and time were record during the test.

TABLE 5

| | |
|---|---|
| Microduct OD/ID | 5/3.5 mm |
| Microduct surface finish | Smooth |
| Lubrication | None |
| Bend diameter | 400 mm |
| Total route length | 1000 m |
| Leg length (L) | 100 m |
| Blowing equipment | Air Blown Fiber Installation Tool (LTT 179 2011) |
| Other | Compressed air was used to during the test |

Figure 6A:
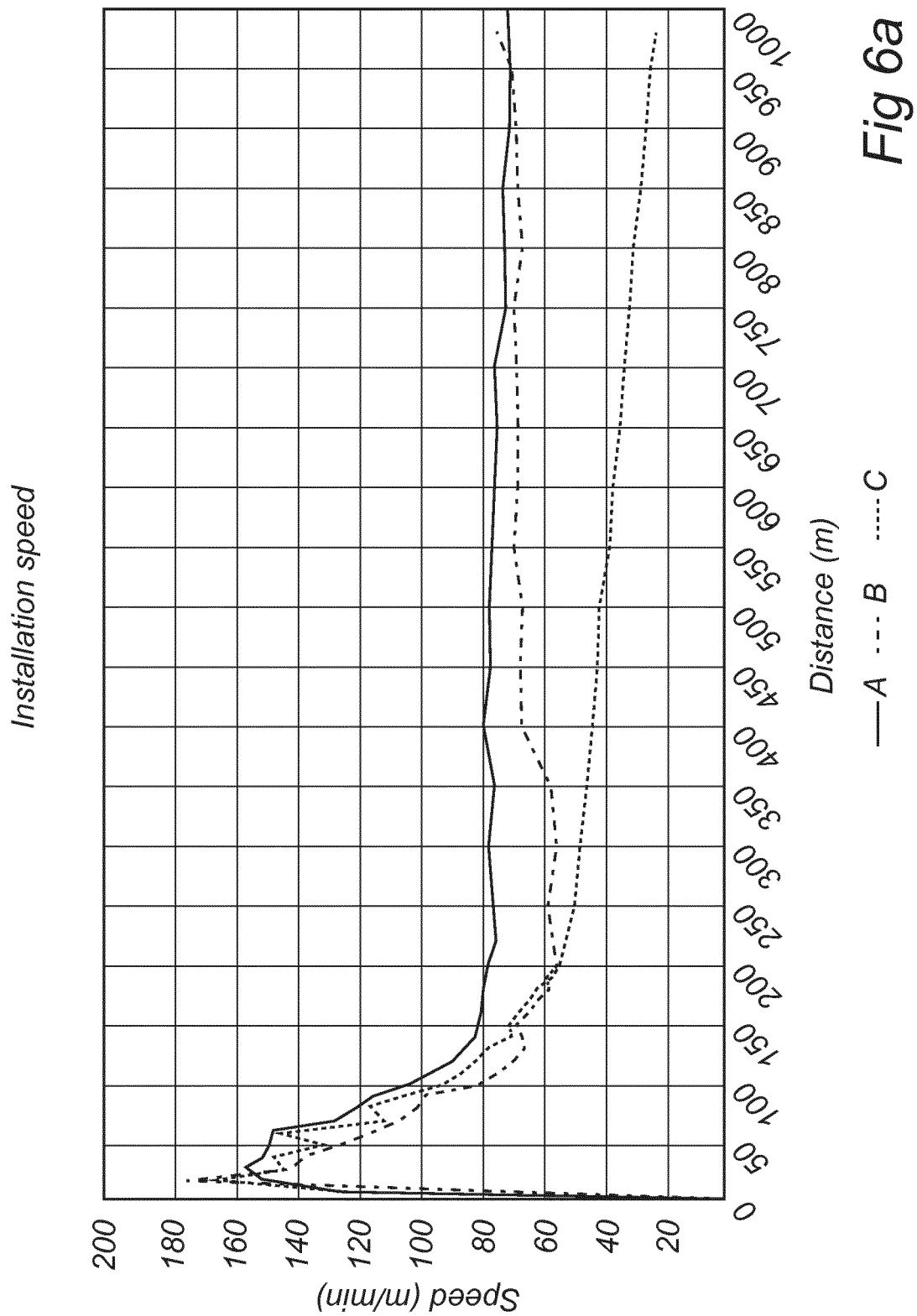

The results are shown in the graphs of FIGS. 6a-b. The cable assemblies according to Examples 1a ("A", solid line) and 1b ("B", dashed line) showed excellent blow installation performance, being successfully installed 1000 m in less than 13 minutes, at a final speed of more than 70 m/min. The cable assembly according to Example 1 c ("C", dotted line) was successfully installed 1000 m in 23 minutes.

The person skilled in the art realizes that the present invention by no means is limited to the preferred embodiments described above. On the contrary, many modifications and variations are possible within the scope of the appended claims. For example, a skilled person would recognize that a cable assembly according to the invention could comprise additional layers arranged between the first layer and the second layer, if desired. Also the optical fibres are normally covered by a separate thin protective layer for each individual fibre. Moreover, although a UV-cured acrylate is described as preferred for the first layer, it is to be understood that some other suitable polymer could be used instead.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A cable assembly adapted to be installed into a duct by a combination of blowing and mechanical feeding, said cable assembly comprising:
   at least one flexible signal transmitting member for transmitting optical signals;
   a first layer surrounding said at least one flexible signal transmitting member such that at least one flexible signal transmitting member is in touching contact with said first layer; and
   a second layer arranged outwardly of said first layer, said second layer being a non-thermoplastic layer made of a composition comprising a base material of crosslinkable polyethylene, whereby the second layer comprises crosslinked polyethylene,
   the second layer including crosslinked polyethylene and non-crosslinked polyethylene, the second layer including non-crosslinked polyethylene from more than 0% to 50% by weight.

2. The cable assembly according to claim 1, wherein the second layer has a degree of crosslinking of at least 15%, preferably at least 30%, as determined according to ISO 10147:2011.

3. The cable assembly according to claim 1, wherein the second layer has a layer thickness of up to 400 μm.

4. The cable assembly according to claim 1, wherein the crosslinked polyethylene is a low density polyethylene or medium density polyethylene, and the second layer further comprises non-crosslinked HDPE at a content of from 20% to 50% by weight of second layer.

5. The cable assembly according to claim 1, wherein the crosslinked polyethylene, and any further polyethylene contained in the second layer in total exhibits a density in a range of 926 to 960 kg/m$^3$ according to ISO 1183-1:2012.

6. The cable assembly according to claim 1, wherein the crosslinked polyethylene is a silane-crosslinked polyethylene.

7. The cable assembly according to claim 1, wherein the second layer has a material that is homogeneous in that it is free of items such as beads, balls, flakes, or fibres.

8. The cable assembly according to claim 1, comprising at least two flexible signal transmitting members for transmitting optical signals.

9. A method of manufacturing a cable assembly comprising at least one flexible signal transmitting member for transmitting optical signals, comprising:
   a) providing at least one flexible signal transmitting member coated with a first layer;
   b) providing a molten composition comprising at least one crosslinkable thermosetting polyethylene, a non-crosslinkable polyethylene having a higher density than said crosslinkable thermosetting polyethylene, and optionally a crosslinking agent;
   c) applying said molten composition around said at least one flexible signal transmitting member to form a second layer of said molten composition outwardly of said first layer; and
   d) allowing the at least one crosslinkable thermosetting polyethylene to crosslink, the second layer, after crosslinking, includes non-crosslinked polyethylene at a content of from more than 0% to 50% by weight.

10. The method of manufacturing a cable assembly according to claim 9, wherein crosslinking of the at least one crosslinkable thermosetting polyethylene requires an action of one or more crosslinking agent(s) selected from the group consisting of: a catalyst, heat, moisture, UV radiation and gamma radiation.

11. The method of manufacturing a cable assembly according to claim 10, wherein the at least one crosslinkable thermosetting polyethylene is crosslinkable using a catalyst, and step b) further comprises mixing the at least one crosslinkable thermosetting polyethylene and said catalyst.

12. The method of manufacturing a cable assembly according to claim 11, wherein the at least one crosslinkable thermosetting polyethylene and the catalyst are mixed in a dry state to form a mixture, and said mixture is subsequently melted.

13. The method of manufacturing a cable assembly according to claim 11, wherein the at least one crosslinkable thermosetting polyethylene is a silane-crosslinkable polyethylene and a silane catalyst is mixed with the at least one crosslinkable thermosetting polyethylene or added to said molten composition.

14. The cable assembly according to claim 2, wherein the second layer has a layer thickness of up to 400 μm.

15. The method of manufacturing a cable assembly according to claim 12, wherein the at least one crosslinkable thermosetting polyethylene is a silane-crosslinkable polyethylene and a silane catalyst is mixed with the at least one crosslinkable thermosetting polyethylene or added to said molten composition.

16. A method comprising:
   installing a cable assembly into a duct by a combination of blowing and mechanical feeding, said cable assembly comprising:
   at least one flexible signal transmitting member for transmitting optical signals;
   a first layer surrounding said at least one flexible signal transmitting member such that at least one signal transmitting member is in touching contact with said first layer; and
   a second layer arranged outwardly of said first layer, said second layer being a non-thermoplastic layer made of a composition comprising a base material of crosslinkable polyethylene, whereby the second layer comprises crosslinked polyethylene,
   the second layer including crosslinked polyethylene and non-crosslinked polyethylene, the second layer including non-crosslinked polyethylene at a content of from more than 0% to 50% by weight.

17. The method according to claim 16, wherein the second layer has a degree of crosslinking of at least 15%, preferably at least 30%, as determined according to ISO 10147:2011 or the second layer has a layer thickness of up to 400 μm.

18. The method according to claim 16, wherein the crosslinked polyethylene, and any further polyethylene contained in the second layer in total exhibits a density in a range of 926 to 960 kg/m$^3$ according to ISO 1183-1:2012.

* * * * *